(12) United States Patent
Yaple (10) Patent No.: US 6,484,855 B1
(45) Date of Patent: Nov. 26, 2002

(54) MOTOR VEHICLE HANDLEBARS AND HYDRAULIC SYSTEM THEREFOR

(76) Inventor: Winfred E. Yaple, 645 Fogg, Las Vegas, NV (US) 89110

(*) Notice: Subject to any disclaimer, the term of this patent is extended or adjusted under 35 U.S.C. 154(b) by 0 days.

(21) Appl. No.: 09/839,552

(22) Filed: Apr. 20, 2001

Related U.S. Application Data (60) Provisional application No. 60/199,410, filed on Apr. 24, 2000.

(51) Int. Cl.[7] .............................................. F16D 67/02
(52) U.S. Cl. ..................... 192/13 R; 180/219; 74/551.8
(58) Field of Search ........................... 192/12 R, 13 R, 192/12 C, 221, 225, 85 C; 477/108; 74/488, 501.54, 552, 551.8, 502.2, 489, 567, 569, 551.1; 180/219; 188/344

(56) References Cited

U.S. PATENT DOCUMENTS

| | | | | |
|---|---|---|---|---|
| 4,501,340 A | * | 2/1985 | Yoshida ....................... 137/351 |
| 4,560,049 A | * | 12/1985 | Uchibaba et al. ...... 188/196 M |
| 4,635,442 A | * | 1/1987 | Bass ........................... 188/344 |
| 4,779,482 A | * | 10/1988 | Kawaguchi ................. 188/196 |
| 4,838,113 A | * | 6/1989 | Matsushima et al. ............. 2/17 |
| 4,840,082 A | * | 6/1989 | Terashima et al. .............. 74/489 |
| RE33,578 E | * | 4/1991 | Bass ........................... 60/594 |
| 5,050,381 A | * | 9/1991 | Matsuno et al. ............ 188/344 |
| 5,636,518 A | * | 6/1997 | Burgoyne et al. ............. 60/594 |
| 6,189,319 B1 | * | 2/2001 | Petty .......................... 760/453 |
| 6,209,687 B1 | * | 4/2001 | Hundley ................. 188/24.16 |
| 6,250,447 B1 | * | 6/2001 | Brandl et al. ............... 188/352 |

FOREIGN PATENT DOCUMENTS

EP           0 100 179 A1  *  2/1984

* cited by examiner

Primary Examiner—Charles A Marmor
Assistant Examiner—David D. Le
(74) Attorney, Agent, or Firm—Robert Ryan Morishita; Anderson & Morishita (57) ABSTRACT

In a first aspect of the present invention, the system of the present invention includes motor vehicle handlebars in which the cables, wires, and lines are disposed within the bars for protection and aesthetics. The handle of the handlebars includes channels for cables, wires, lines, and the like running from the controls at the handles to the devices controlled. To accommodate the wires, the system further includes small switches in which the contacts maintain the switch in the closed position when contact is made. A second aspect of the present invention includes an oil reservoir for a hydraulic brake or clutch system. The reservoir includes a reservoir piston. The piston includes a stem, optionally removable, for bleeding air from the reservoir. The reservoir fluidly communicates with a fill hole and a master cylinder.

14 Claims, 8 Drawing Sheets

MOTOR VEHICLE HANDLEBARS AND HYDRAULIC SYSTEM THEREFOR

RELATED APPLICATION DATA

This application claims the priority of U.S. Provisional Application Ser. No. 60/199,410 entitled "Motorcycle Handlebars and Hydraulic System Therefor" filed Apr. 24, 2000 by Applicant herein.

FIELD OF THE INVENTION

The present invention relates to motor vehicle handlebars and hydraulic systems for actuating hydraulic brakes or hydraulic clutches. Specifically, the present invention is a motor vehicle handlebar with the cables, lines, and wires disposed within the handlebars and a hydraulic system actuated from the handlebars including an oil reservoir having a movable piston disposed therein.

BACKGROUND OF THE INVENTION

Many types of motor vehicles, such as motorcycles, all-terrain vehicles ("ATVs"), farm equipment, personal watercraft, and the like, utilize handlebars with controls thereon for actuating the motor vehicle brake, clutch, and the like. Such motor vehicle handlebars include many control switches as well as the cables, wires, hydraulic lines, and the like that run from the controllers to the components controlled. This can be unsightly but can also be dangerous because the cables, wires, hydraulic lines, and the like are exposed. Weather, debris, accidents, or similar external conditions can cause deterioration or damage to the exposed wires, cables, lines, and the like.

A similar problem is that the present hydraulic systems for operating hydraulic brakes and clutches for such motor vehicles require the use of external, gravity-fed oil reservoirs for the hydraulic fluid. These oil reservoirs are usually mounted above the handlebars with a hydraulic line extending from the oil reservoir to the hydraulic system. Not only are such oil reservoirs unsightly, but they are also exposed to weather elements or other conditions, such as road accidents, that may damage the reservoirs and allow oil to be released. Moreover, such reservoirs do nothing to insure that air does not enter the hydraulic system when the reservoir is refilled. Also, such reservoirs often use a bladder to maintain pressure in the hydraulic system when minute amounts of oil are drawn from the reservoir.

One response to these problems is shown in U.S. Pat. No. 4,501,340 issued to Yoshida. Yoshida shows a reservoir disposed between the handle and bars of a handlebar. However, one drawback of Yoshida is that the reservoir is refilled in the same manner as the gravity feed reservoirs. That is, Yoshida does nothing to release air from the system during refills. Moreover, Yoshida uses a conventional bladder to maintain pressure in the system.

Therefore, it can be seen that there is a need in the art for a handlebar and hydraulic system therefor that protects the oil reservoir. There is also a need in the art for a motor vehicle handlebar that protects the wires, lines, and cables from damage and weather elements.

SUMMARY OF THE INVENTION

The present invention has two aspects. A first aspect of the present invention is a system for enclosing the cables, wires, and lines running from the controls on the handlebars to the components controlled for the purposes of aesthetics and protection. A second aspect of the present invention is a hydraulic system actuated from the handlebars by a master cylinder that includes a reservoir that does not require gravity to feed the hydraulic system.

According to the first aspect of the present invention, the system of the present invention includes motor vehicle handlebars in which the cables, wires, and lines are disposed within the bars for protection and aesthetics. The handle of the handlebars includes channels for the cables running from the throttle controls to the throttle of the motor vehicle through the handlebars. Also, the hydraulic lines run through the handlebars of the motor vehicle. The system further includes switches in which the contacts maintain the switch in the closed position when contact is made. Optionally, the system further includes a cruise control using a cam rather than the conventional threaded stop.

Related to the first aspect of the invention is a riser for securing the handlebars to a triple tree of a motorcycle. A riser body with at least one stud channel and a passage therethrough is provided. A removable saddle clamp is mounted on the handlebars. Optionally, two saddle clamps may be provided. Each saddle clamp includes a substantially continuous eyelet that encircles the handlebars. The saddle clamps also each include a stud extending from the eyelet. The studs are of a length that permit each stud to pass through a stud channel of the rider body and through a hole in the triple tree. Fasteners are securable to the stud such that when the fasteners are tightened, i.e. properly positioned to bear against the triple tree, the handlebars bear against the riser body and the saddle clamps to secure the handlebars to the triple tree. That is, the saddle clamps and the riser body cooperate with the studs to hold the handlebars against the triple tree. In an optional embodiment, a cap may be removably attached to the riser body. Once mounted, any wires, cables, tubing or the like may be passed through the passage in the riser body.

In a second aspect of the present invention, an oil reservoir is provided for a hydraulic brake or clutch system. The reservoir may optionally be located in the handle of the handlebars, however, it is contemplated that the reservoir may be located anywhere on the motor vehicle. The reservoir is bounded by walls and a reservoir piston. The piston includes a stem, optionally a removable stem, for aiding in bleeding air from the reservoir. The reservoir fluidly communicates with a fill hole and a master cylinder. The present invention also includes a slave cylinder that may be connected to a clutch.

It is an object of the present invention to provide a hydraulic reservoir that does not require gravity to feed the hydraulic system and provides a way to bleed air from the reservoir. A further object of the present invention is to provide a system for protecting the exposed wires, cables, and lines running from the handlebars of a motor vehicle.

DESCRIPTION

Figure 1:
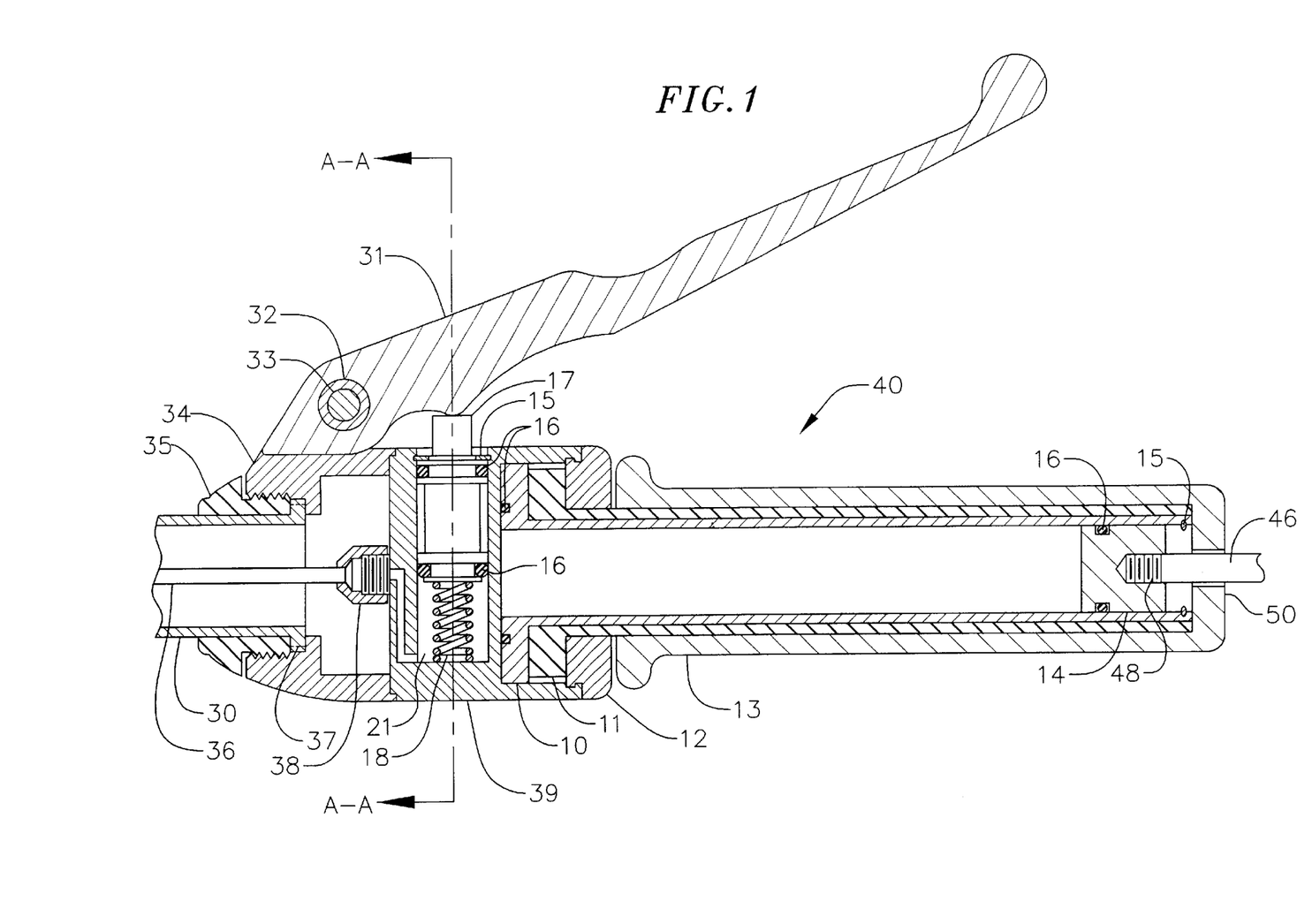
FIG. 1 is a cutaway side view of an embodiment of a device according to the present invention.
Figure 2:
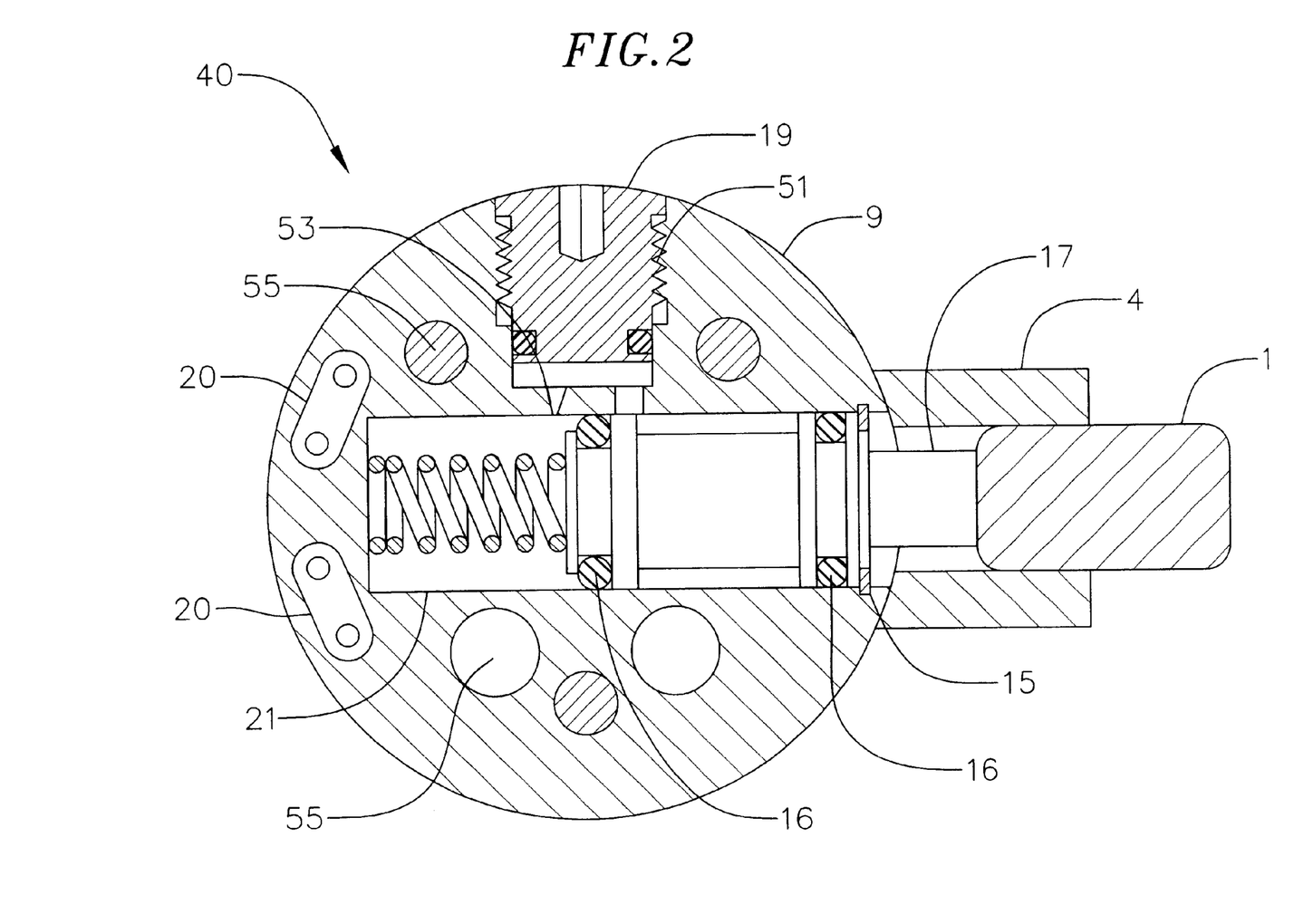
FIG. 2 is a cutaway view of the master cylinder and fill port of the present invention taken along section line A—A of FIG. 1.
Figure 3:
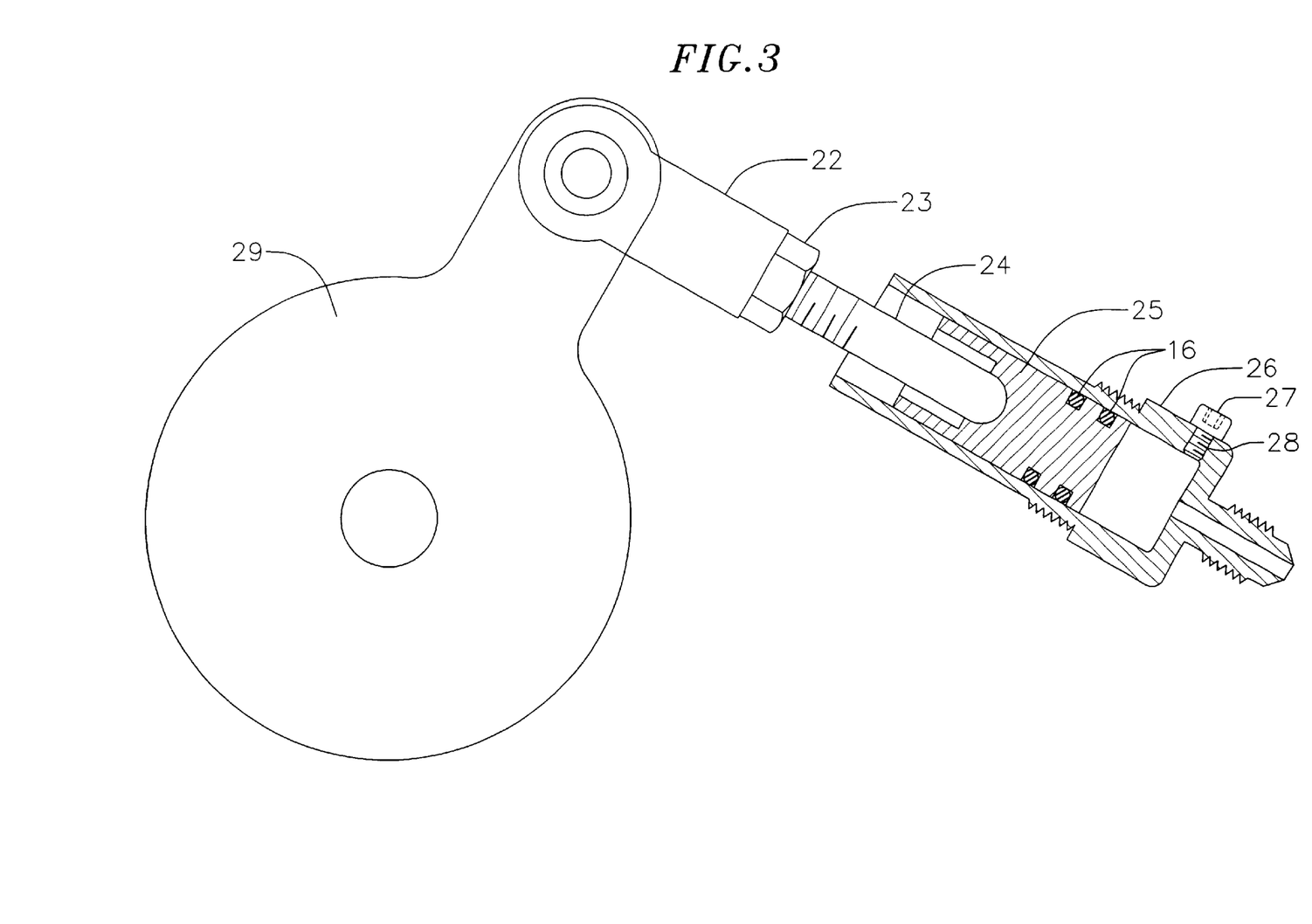
FIG. 3 is a sectional cutaway view of the slave cylinder and a clutch adapted to receive the slave cylinder.

Reference is now made to the figures wherein like parts are referred to by like numerals throughout. The present invention is adapted for use with any type of motor vehicles using handlebars 30 with controls mounted thereon, such as motorcycles, ATVs, personal watercraft, farm equipment, and the like. With reference to FIGS. 1–3, the present invention has two aspects. The first aspect of the present invention is a system for protecting the cables, wires, and lines by running the cables, wires, and lines from the controls at the handlebars 30 through the handlebars 30 to the components controlled.

According to the first aspect of the present invention, hollow handlebars 30 are provided. A handle 40 is optionally removable so that the lines, wires, cables, and the like are accessible. In the optional embodiment shown in FIG. 1, the handle 40 is secured by a handlebar nut 35 threadably engaged to the forward housing 34 of the handle 40. A handlebar index ring 37 disposed at the end of the handlebar 30 between the handlebar nut 35 and the handle 40 is optionally serrated to engage serrates on the mating surface of the forward housing 34. In this fashion, the handle 40 is secured from both lateral and rotational movement. In an alternate embodiment, the handle 40 is secured to the handlebars 30 using set screws (not shown) rather than an index ring 37.

As shown in FIG. 2, the body of the handle 40 includes a plurality of channels 55 through which the lines, wires, cables, and the like run so that they may be disposed in the hollow handlebars 30. For example, the throttle actuator 11 is typically a rotatable sleeve disposed in, and secured to, the grip 13. The throttle actuator 11 is held to the handle 40 by the rear housing 12. To actuate the throttle, cables run from the throttle actuator 11 to the throttle so that when the throttle actuator 11 is rotated, tension in the cables increase or decrease the fuel and air fed to the engine. In the present invention, channels 55 through the handle 40 are created for the throttle cables to run from the rotatable push-pull type throttle actuator 11 to the throttle.

Figure 4:
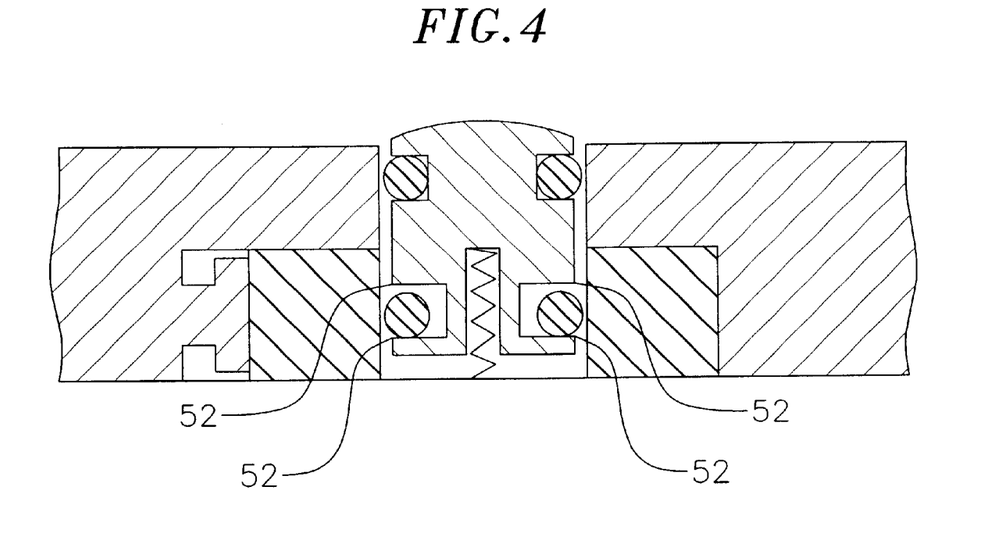
FIG. 4 is a sectional cutaway view of a switch according to an embodiment of the present invention.

Also, with reference to FIG. 4, compact switches 20 have been created which include contacts 52 disposed inside the handle 40 SO that the wires may run inside the handlebars 30. The contacts 52 provide both the means for closing the switch 20 as well as providing the means for maintaining the switch 20 in the closed position.

Referring again to FIGS. 1 and 2, the hydraulic lines 36 running from the master cylinder 21, as described in more detail below, also run through the hollow handlebars 30. Thus, the handle 40 with the channels 55 disposed therein secured to the hollow handlebars 30 allow the wires, cables, lines, and the like to be run from the controls and actuators on the handlebars 30 through the handlebars 30 to the devices controlled by the controls and actuators.

Figure 5:
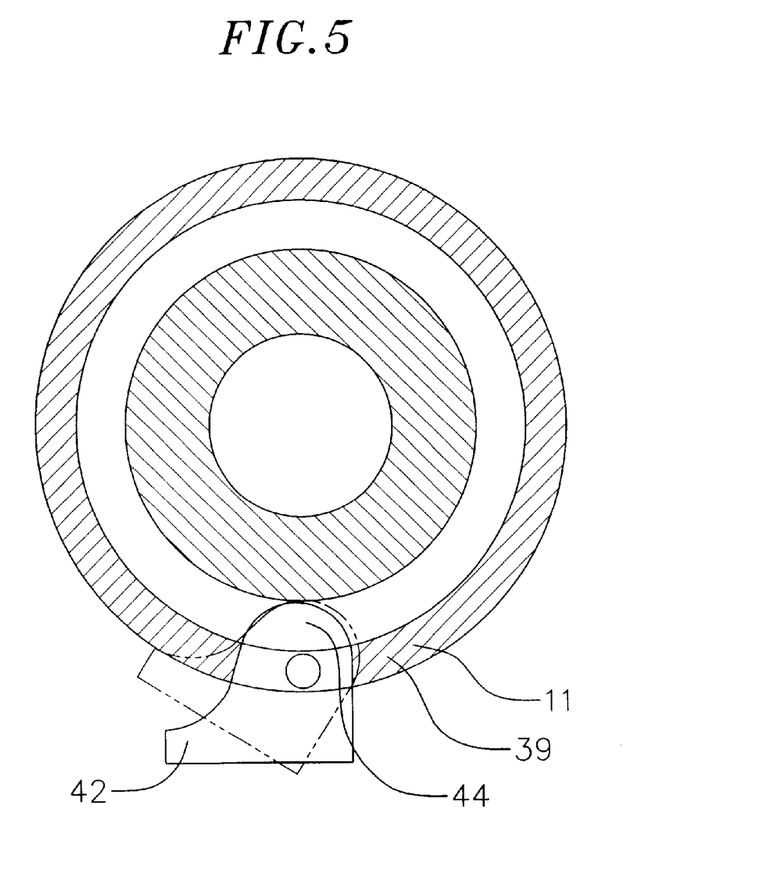
FIG. 5 is a sectional cutaway view showing the cruise control lever in both an engaged position and a disengaged position.

Along with the switches 20 and controls described herein, a novel cruise control switch is provided. In the prior art, cruise control switches essentially consist of a threaded bolt disposed in a threaded hole. The cruise control of the prior art is operated by selecting the throttle setting desired and securing the throttle actuator 11 by tightening the threaded bolt to engage and hold the rotatable throttle actuator 11 at the desired position. By contrast, as shown in FIG. 5, the present invention includes a cruise control lever 42 having a cam 44. The cruise control lever 42 is disposed proximate the throttle actuator 11 such that the cam 44 engages and holds the rotatable throttle actuator 11 when the cruise control lever 42 is engaged but allows free rotation of the throttle actuator 11 when the cruise control lever 42 is disengaged.

Figure 8:
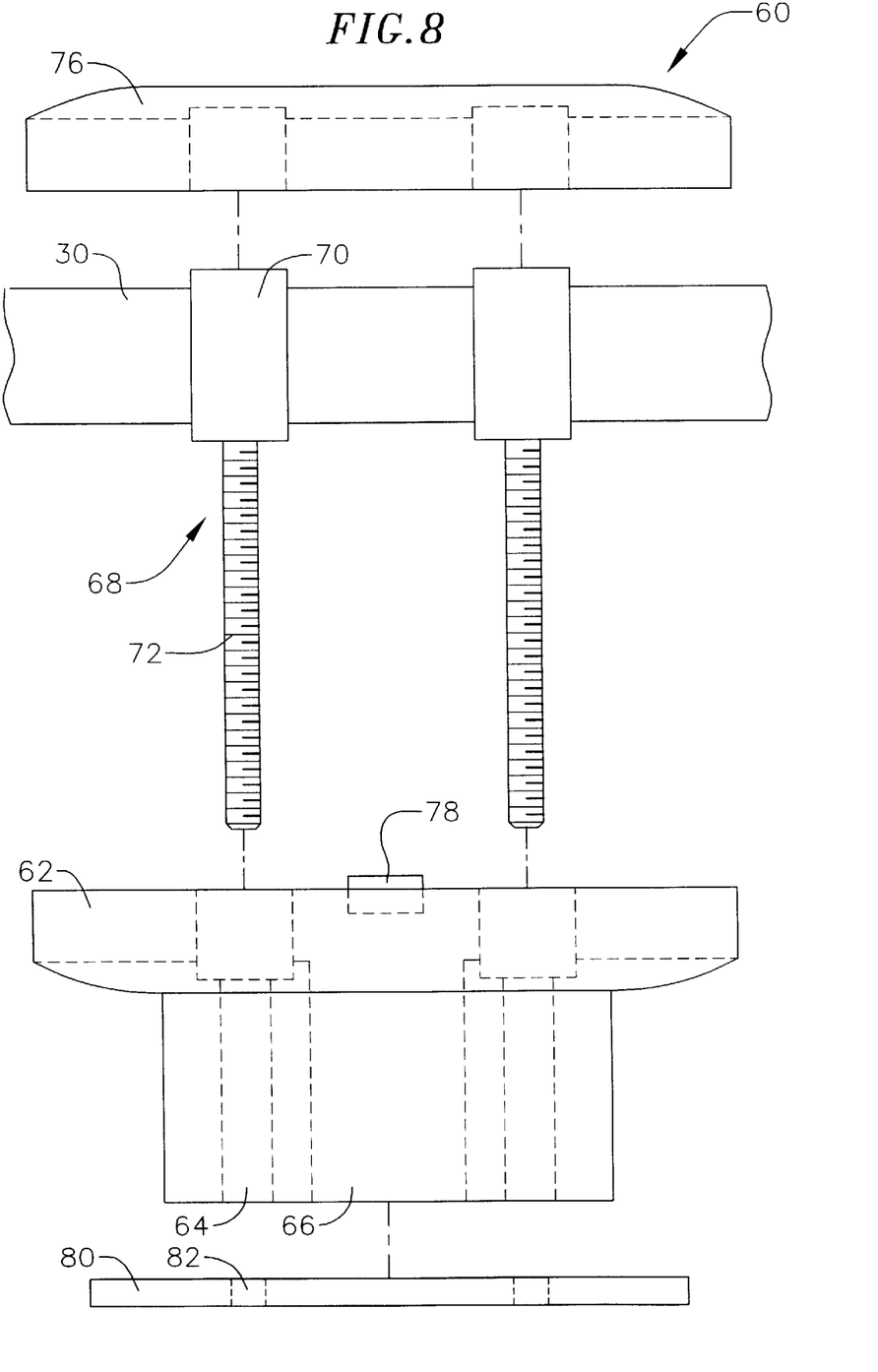
FIG. 8 is a front assembly view of a riser according to an embodiment of the present invention.
Figure 9:
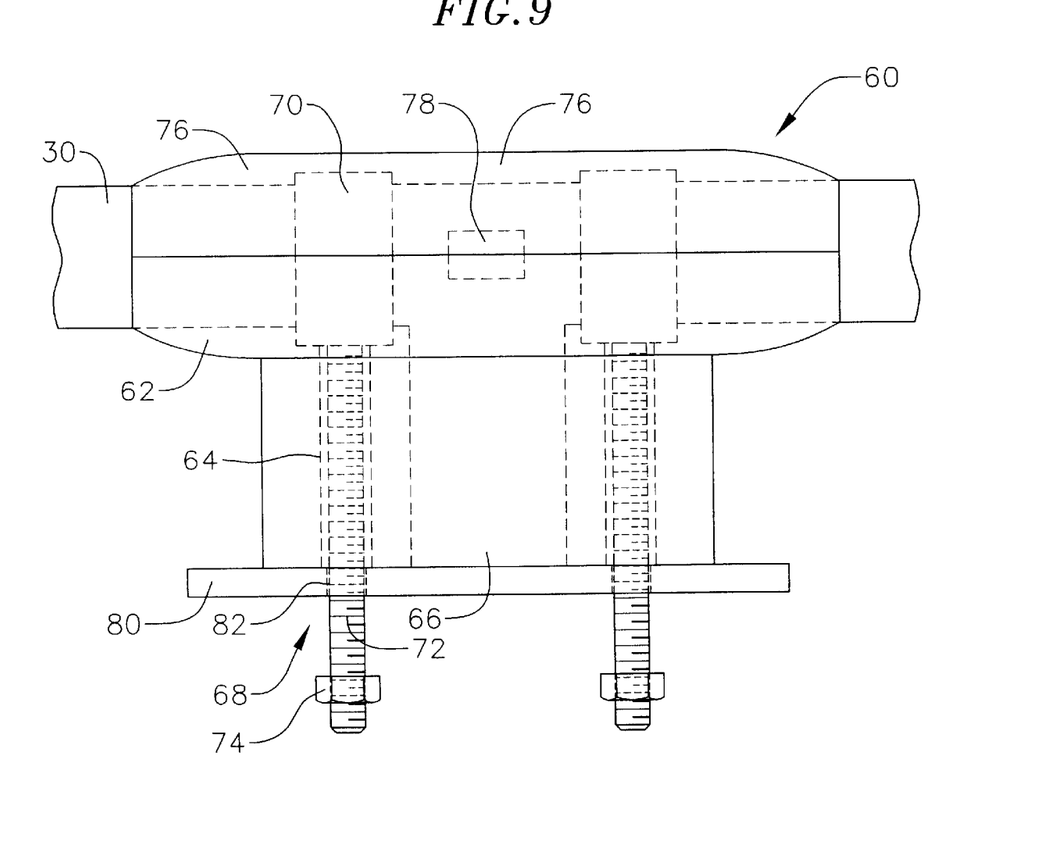
FIG. 9 is a front view of the riser of FIG. 8 assembled.

Referring to FIGS. 8 and 9, the first aspect of the present invention could further incorporate a riser 60 for passing wires, cables, hydraulic lines, and the like from the interior of the handlebars 30 to the motorcycle in a concealed and protected fashion. Moreover, the riser 60 may include a design that eliminates the necessity for external bolts as are used in the prior art. For example, as shown in FIGS. 8 and 9, a riser 60 could be provided that includes a riser body 62. The riser body includes at least one stud channel 64 and a passage 66 therethough. As will be discussed below, the wires, cables, hydraulic lines, and the like may be passed through, and concealed and protected by, the passage 66 through the riser body 62.

At least one saddle clamp 68 is provided. Each saddle clamp 68 includes a substantially continuous eyelet 70 that substantially encircles the handlebars 30. It is important to note that the eyelet 70 need not completely encircle the handlebars 30 so long as the eyelet 70 contacts the upper portion of the handlebars 30. The eyelet 70 is secured to a stud 72. The stud 72 is optionally threaded. The stud 72 is of a length such that the stud 72 may removably extend through the riser body 62 and through a hole 82 in the triple tree 80. As is known in the art, washers, bushings, sleeves, or the like may be disposed between the riser body 62 and the triple tree 80, between the stud 72 and the triple tree 80, or the like. Fasteners 74 are provided such that when the fasteners are properly positioned on the stud 72, i.e. tightened to bring the fastener 74 to bear against triple tree 80, the handlebars 30, are held against the riser body 62 by the saddle clamp 68. Thus positioned, the saddle clamp 68 or clamps and the riser body 62 cooperate to hold the handlebars 30 securely to the triple tree 80. In an optional embodiment, a removable cap 76 may be provided. In such an optional embodiment, the cap 76 may be held to the riser body 62 using, for example, a spring 78.

In a second aspect of the present invention, a hydraulic system is provided in which a slave cylinder 26 is actuated from the handlebars 30 by a master cylinder 21 communicating with an oil reservoir 10. As shown in FIG. 1, the reservoir 10 of the present invention may optionally be disposed in the grip 13 of the handle 40. However, because the hydraulic system is a closed system once the fill plug 19 is secured, the reservoir 10 may be located anywhere on the motor vehicle. Moreover, because the reservoir 10 does not require gravity to drive the hydraulic fluid from the reservoir 10, the reservoir 10 may be located vertically lower than the master cylinder 21.

The reservoir 10 includes a reservoir piston 14 disposed in the reservoir 10. The reservoir piston 14 is fluidly sealed against the reservoir 10 walls using, for example, O-rings 16 and clip rings 15. The reservoir piston 14 attaches to a stem 46 to allow the reservoir piston 14 to be manually moved within the reservoir 10. Optionally, a return spring 23 may be attached to the reservoir piston 14 biased to apply pressure to the reservoir piston 14. In such an optional embodiment, the return spring 23 is biased to press against the reservoir piston 14 to maintain enough pressure in the reservoir 10 that hydraulic fluid flows to the master cylinder 21 when necessary. As shown in FIG. 1, the stem 46 may be threaded to mate with a stem hole 48 in the reservoir piston 14. In such an embodiment, the stem 46 is removable. To accommodate the stem 46, the handle 40 may include a hole 50 to allow access to the reservoir piston 14.

The reservoir 10 communicates with a master cylinder 21 positioned in the center housing 39. The master cylinder 21 includes a master cylinder piston 17 disposed therein. The master cylinder piston 17 is sealed against the master cylinder 21 walls using, for example, O-rings 16 and clip rings 15. The master cylinder 21 is actuated using a control lever 31 pivotable about a pivot 33. The pivot 33 may be surrounded by a bushing 32 to facilitate rotation. The master cylinder 21 includes a master cylinder spring 18 to return the master cylinder piston 17 to the uncompressed position after the control lever 31 is released. The master cylinder 21 communicates via a port with a hydraulic line 36 that is secured using a seal nut 38. The hydraulic line 36, in turn, communicates with a slave cylinder 26. The slave cylinder 26 is mechanically connected to a clutch 29, brake, or the like for actuation thereof. As shown in FIG. 4, the slave cylinder piston 25 disposed in the slave cylinder 26 drives a push rod 24. The push rod 24 actuates the device, in this example a clutch 29. The slave cylinder 26 further includes a bleed screw 27 to facilitate bleeding of the hydraulic system.

Figure 6:
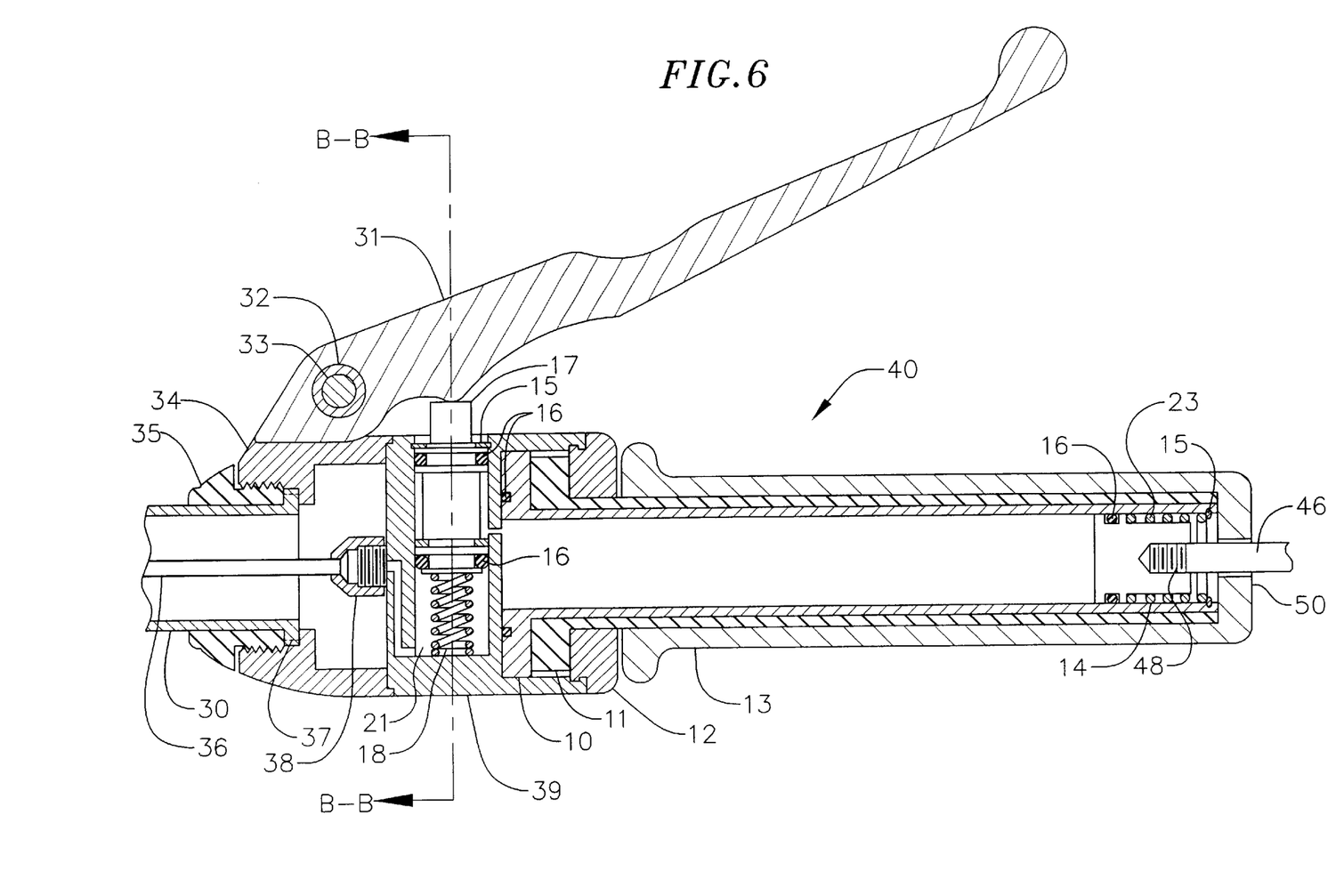
FIG. 6 is a cutaway side view of an alternate embodiment of a device according to the present invention.
Figure 7:
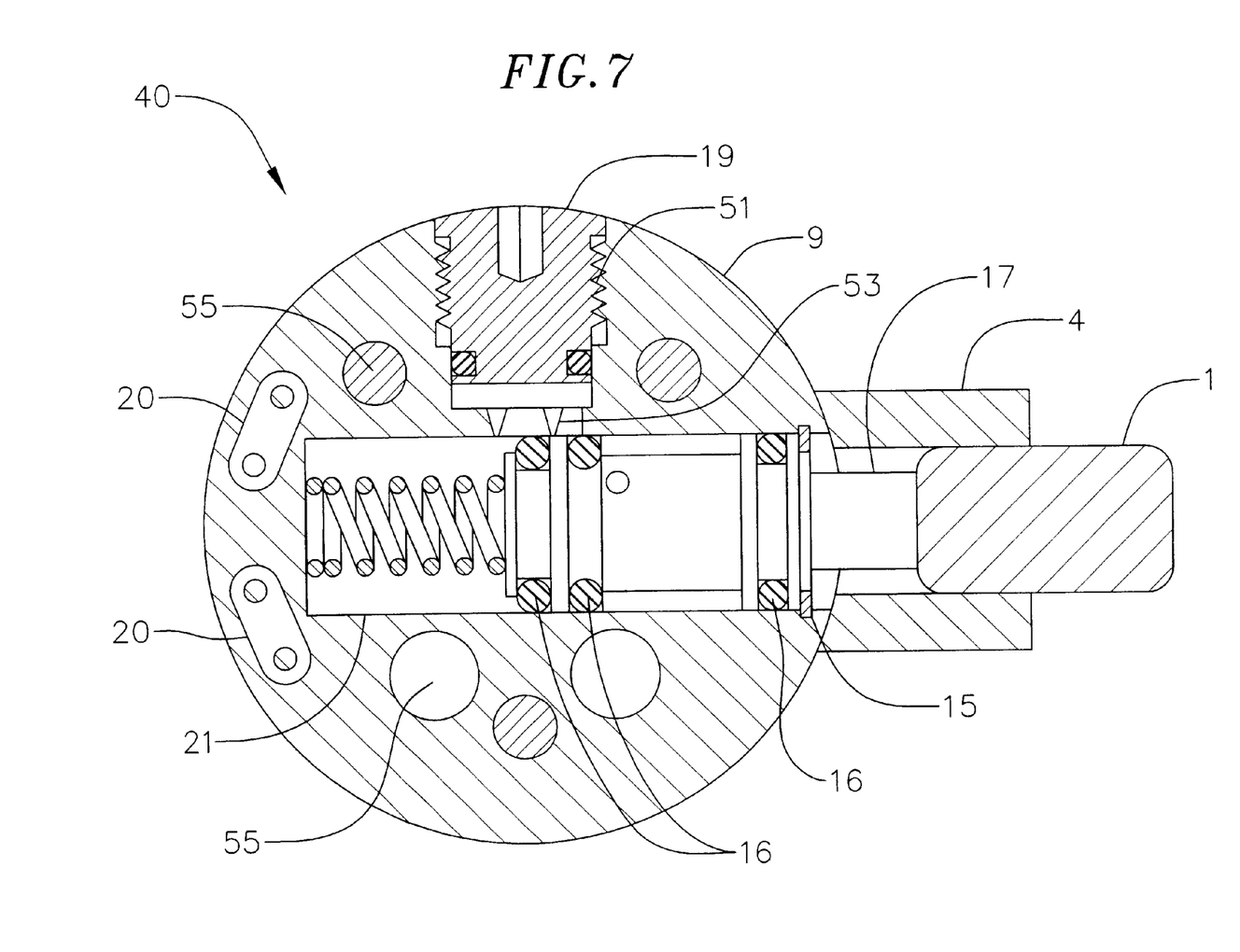
FIG. 7 is a cutaway view of the master cylinder and fill port of the present invention taken along section line B—B of FIG. 6.

Referring again to FIGS. 1 and 2, the master cylinder 21 fluidly communicates with a fill hole 51 through a fill hole port 53. In an optional embodiment, the fill hole 51 includes internal threads to threadably engage a threaded fill plug 19. As shown in FIGS. 6 and 7, in an optional alternate embodiment, more than one fill hole port 53 may be provided. In such an embodiment, an additional O-ring 16 may be disposed on the master cylinder piston 17.

Referring to FIGS. 1–7, in use, the hydraulic system is first charged with hydraulic fluid. Any hydraulic fluid know n in the art, such as oil, may be used. The fill hole plug 19 is removed and hydraulic fluid is poured into the fill hole 51. The stem 46 is secured to the reservoir piston 14 and the reservoir piston 14 is drawn axially to expand the volume of the reservoir 10 and thereby draw the hydraulic fluid from the fill hole 51 into the reservoir 10. Once a sufficient amount of hydraulic fluid is drawn into the reservoir 10, the stem 46 is used to drive the reservoir piston 14 axially to force any air from the reservoir 10 and master cylinder 21 through the fill hole port 53. Once hydraulic fluid appears at the base of the fill hole 51, the fill hole plug 19 is replaced. The stem 46 may optionally be removed and the slave cylinder 16 may be further bled in a conventional fashion using the bleed hole 28 at the slave cylinder 26.

To utilize the present invention, the master cylinder piston 17 is actuated by pivoting the control lever 31. As the master cylinder piston 17 moves in the master cylinder 21, hydraulic fluid is driven from the master cylinder 21 to the slave cylinder 26. The slave cylinder piston 25 moves axially and actuates the device controlled, i.e. the brake, clutch 29, or the like. As the control lever 31 is released, the master cylinder spring 18 drives the master cylinder piston 17 upward. Simultaneously, the slave cylinder piston 25 returns to its resting position. This combination causes hydraulic fluid to flow back to the master cylinder 21. The reservoir piston 14 moves axially to equalize the pressure. Under most circumstances, the movement of the reservoir piston 14 is minimal.

While certain embodiments of the present invention have been shown and described it is to be understood that the present invention is subject to many modifications and changes without departing from the spirit and scope of the claims presented herein.

I claim:

1. A system for actuating one of a clutch or brake on a motor vehicle of the type having handlebars for steering, comprising:

a control lever pivotally mounted on said handlebars;

a master cylinder mounted inside said handlebars, said master cylinder including a master cylinder piston axially moveable therein mechanically connected to said control lever;

a slave cylinder in fluid communication with said master cylinder, said slave cylinder including a slave cylinder piston disposed therein, said slave cylinder axially movable responsive to fluid pressure changes caused by movement of said master cylinder piston, said slave cylinder piston mechanically connected to said brake or clutch;

a reservoir in fluid communication with said master cylinder and said slave cylinder, said reservoir having a reservoir piston disposed therein to expand or contract the volume of said reservoir, said reservoir in fluid communication with a fluidly sealable fill hole; and a stem mechanically connected to said reservoir piston and extending from said reservoir such that when said stem is axially withdrawn said reservoir piston moves axially to expand the volume of said reservoir, whereby said system is charged with fluid by filling said fill hole with fluid and withdrawing said stem to draw said fluid into said reservoir then depressing said stem to contract the volume of said reservoir and drive any drawn air from the reservoir and fluidly sealing said fill hole.

2. The system of claim 1 further comprising a return spring attached to said reservoir piston and biased such that said reservoir piston is urged to resist expansion of the volume of said reservoir.

3. The system of claim 1 wherein said reservoir is disposed inside said handlebars.

4. The system of claim 1 further comprising channels inside said handlebars.

5. The system of claim 1 in which said motor vehicle includes a rotatable throttle further comprising a cruise control with a cam rotatable with respect to said throttle such that when said cam is rotated, said cam bears against said throttle to maintain said throttle in a fixed rotational position.

6. The system of claim 1 wherein said stem is removably connected to said reservoir piston.

7. A system for actuating a brake on a motor vehicle of the type having handlebars for steering, comprising:

a brake control lever pivotally mounted on said handlebars;

a master cylinder mounted inside said handlebars, said master cylinder including a master cylinder piston axially moveable therein mechanically connected to said brake control lever;

a slave cylinder in fluid communication with said master cylinder, said slave cylinder including a slave cylinder piston disposed therein, said slave cylinder axially movable responsive to fluid pressure changes caused by movement of said master cylinder piston, said slave cylinder piston mechanically connected to said brake;

a reservoir in fluid communication with said master cylinder and said slave cylinder, said reservoir having a reservoir piston disposed therein to expand or contract the volume of said reservoir, said reservoir in fluid communication with a fluidly sealable fill hole; and a stem mechanically connected to said reservoir piston and extending from said reservoir such that when said stem is axially withdrawn said reservoir piston moves axially to expand the volume of said reservoir, whereby said system is charged with fluid by filling said fill hole with fluid and withdrawing said stem to draw said fluid into said reservoir then depressing said stem to contract the volume of said reservoir and drive any drawn air from the reservoir and fluidly sealing said fill hole.

8. The system of claim 7 further comprising a return spring attached to said reservoir piston and biased such that said reservoir piston is urged to resist expansion of the volume of said reservoir.

9. The system of claim 7 wherein said reservoir is disposed inside said handlebars.

10. The system of claim 7 wherein said stem is removably connected to said reservoir piston.

11. A system for actuating a clutch on a motor vehicle of the type having handlebars for steering, comprising:

a clutch control lever pivotally mounted on said handlebars;

a master cylinder mounted inside said handlebars, said master cylinder including a master cylinder piston axially moveable therein mechanically connected to said clutch control lever;

a slave cylinder in fluid communication with said master cylinder, said slave cylinder including a slave cylinder piston disposed therein, said slave cylinder axially movable responsive to fluid pressure changes caused by movement of said master cylinder piston, said slave cylinder piston mechanically connected to said clutch;

a reservoir in fluid communication with said master cylinder and said slave cylinder, said reservoir having a reservoir piston disposed therein to expand or contract the volume of said reservoir, said reservoir in fluid communication with a fluidly sealable fill hole; and a stem mechanically connected to said reservoir piston and extending from said reservoir such that when said stem is axially withdrawn said reservoir piston moves axially to expand the volume of said reservoir, whereby said system is charged with fluid by filling said fill hole with fluid and withdrawing said stem to draw said fluid into said reservoir then depressing said stem to contract the volume of said reservoir and drive any drawn air from the reservoir and fluidly sealing said fill hole.

12. The system of claim further comprising a return spring attached to said reservoir piston and biased such that said reservoir piston is urged to resist expansion of the volume of said reservoir.

13. The system of claim 11 wherein said reservoir is disposed inside said handlebars.

14. The system of claim 11 wherein said stem is removably connected to said reservoir piston.

* * * * *